United States Patent

[11] 3,576,347

[72] Inventors Lloyd R. Vivian
 Birmingham;
 Karl Budde, Detroit, Mich.
[21] Appl. No. 832,686
[22] Filed June 12, 1969
[45] Patented Apr. 27, 1971
[73] Assignee Ford Motor Company
 Dearborn, Mich.

[54] VEHICLE SEAT ASSEMBLY
 9 Claims, 7 Drawing Figs.
[52] U.S. Cl. .................................................. 297/383,
 297/379, 297/369, 248/393
[51] Int. Cl. .................................................. A47c 3/00,
 B60n 1/02
[50] Field of Search .......................................... 297/383,
 361, 364, 348, 379, 366, 367; 248/393

[56] References Cited
UNITED STATES PATENTS

| 1,685,770 | 10/1928 | Bowen | 297/383X |
| 2,272,980 | 2/1942 | McLellan et al. | 297/383X |
| 2,678,680 | 5/1954 | Haltenberger | 297/383 |
| 2,678,681 | 5/1954 | Haltenberger | 297/383X |
| 2,730,162 | 1/1956 | Davis | 297/383X |

Primary Examiner—Paul R. Gilliam
Attorney—John R. Faulkner and John J. Roethel

ABSTRACT: A vehicle seat assembly comprising a cushion and a backrest forwardly swingable over the cushion. A two-stage latch mechanism interposed between the cushion frame structure and a backrest support arm includes a control lever operable for first stage release of the latch mechanism to unlock the backrest for forward tilting movement and further operable for second stage release of the latch mechanism sequentially of the first stage to permit angular adjustment of the backrest.

PATENTED APR 27 1971 3,576,347

INVENTORS
Lloyd R. Vivian
Karl Budde
BY
John R. Faulkner
John J. Roethel
ATTORNEYS

VEHICLE SEAT ASSEMBLY

BACKGROUND OF THE INVENTION

Vehicle seat designers are faced with many problems in attaining an optimum seat design that will accommodate persons of lone, average or short stature and persons within each of these broad groups having many variations in leg length and torso length. Most of the vehicle seats currently in use are of fixed length, i.e., the distance from the front edge of the seat cushion to the front surface of the backrest is nonadjustable. Because of this many persons do not feel they have proper underknee support. The seat length in a fore and aft direction is either too long or too short for the length of their legs.

A person with short legs can somewhat alleviate this condition by placing an auxiliary cushion behind their back so that in effect they sit closer to the front edge of the seat. The person with long legs cannot do much about the situation.

It has been proposed in the prior art to mount the seat backrest for fore and aft adjustment relative to the seat cushion or seat bottom. Exemplary prior art patents include U.S. Pat. No. 2,121,238 and U.S. Pat. No. 2,678,680.

It is an object of the present invention to adapt the variable seat backrest positioning concept to a vehicle seat assembly in which the seat backrest is forwardly tiltable over the seat cushion to facilitate ingress to or egress from the rear passenger area of a typical two door sedan.

If the backrest is to be forwardly tiltable, the seat-supporting mechanism under current vehicle regulations must incorporate a latch for holding the backrest in its normal upright position. Accordingly, it is a further object of the present invention to include such a latch in the variable position backrest mechanism.

SUMMARY OF THE INVENTION

The vehicle seat assembly embodying the present invention comprises a seat cushion having an associated frame structure. A backrest having depending support arms at each side thereof is pivotally supported in juxtaposition to the seat cushion whereby the backrest is swingable between an upstanding position and a forwardly inclined position. A two-stage latch mechanism is interposed between the frame structure and one of the support arms for controlling backrest angle lock, and for controlling backrest angle adjustment.

As used herein, backrest angle lock refers to the holding or positioning of the backrest in the upstanding position to which it is returnable after having been tilted forwardly.

It is through the control of the backrest angle adjustment that the variable length seat concept is achieved. The two-stage latch mechanism has a control lever first operable to release a first stage of the latch mechanism to unlock the backrest for forward tilting movement about the pivot means and further operable to release a second stage of the latch mechanism sequentially of the first stage release to permit angular adjustment of the backrest through a limited range of movement relative to the seat cushion.

DESCRIPTION OF THE DRAWINGS

Other objects, advantages and features of the present invention can be made more apparent as this description proceeds reference being had to the accompanying drawings, wherein:

FIGS. 5, 6 and 7 are section views on the lines 5-5, 6-6 and 7-7, respectively.

DETAILED DESCRIPTION OF THE INVENTION

Figure 1:
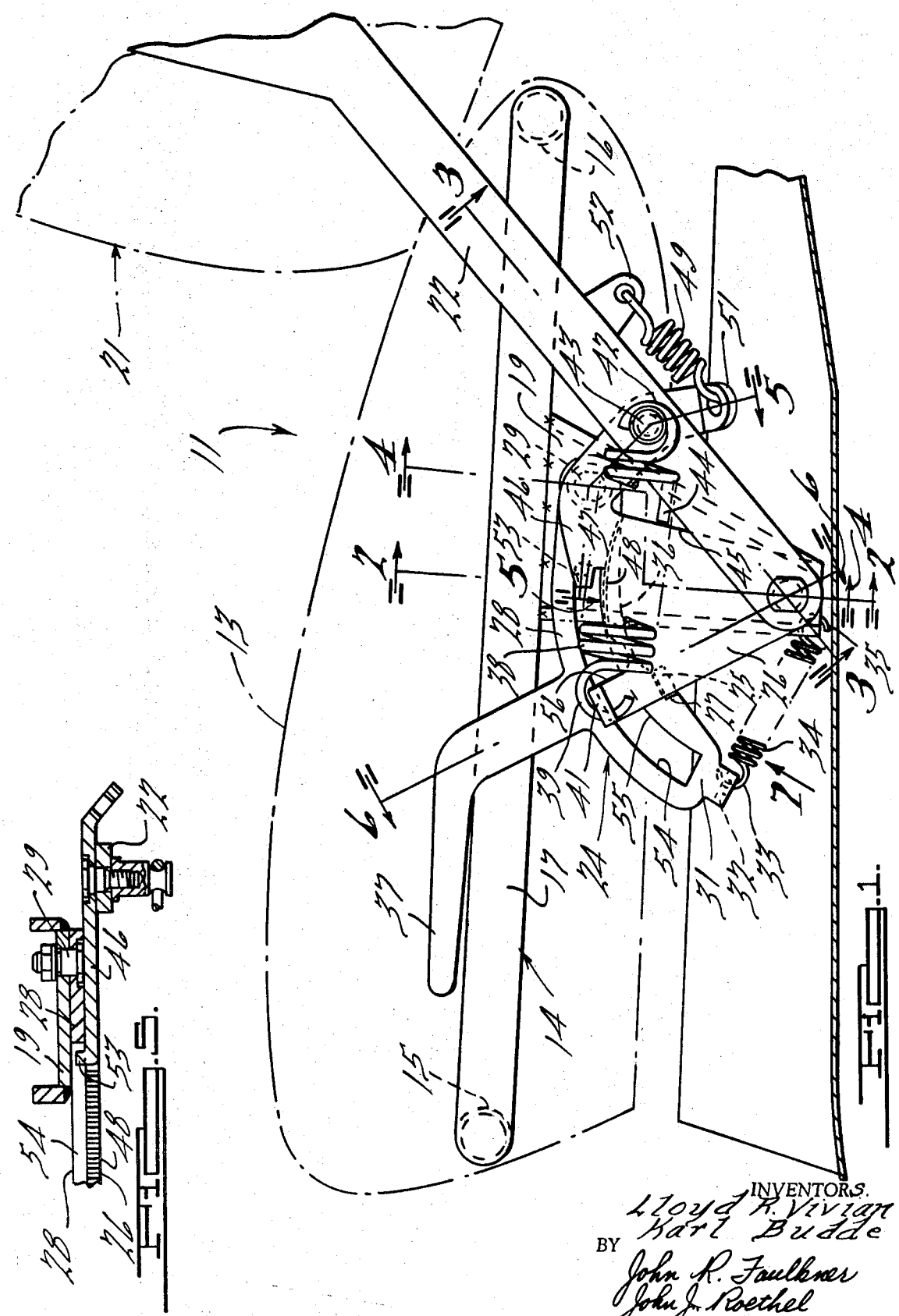
FIG. 1 is a side elevation of a vehicle seat assembly embodying the present invention with part of the vehicle floor being shown in section.

Referring now to the drawings, and more particularly to FIG. 1, there is illustrated a vehicle seat assembly, generally designated 11, adapted to be mounted on a floor 12 of a passenger compartment of a vehicle body. The seat assembly 11 comprises a seat cushion 13 which is carried on a tubular seat frame structure 14 having front and rear members 15 and 16, respectively, and side members 17 and 18.

It will be understood that the seat cushion frame structure 14 may be fixedly supported on the vehicle floor 12 or that it may be supported on a seat track mechanism such as disclosed in U.S. Pat. No. 3,001,835. It is only necessary that the frame structure 14 be supported at a high enough level to accommodate a pair of depending brackets 19, one of which is welded or otherwise secured to each side frame member 17 and 18.

The seat assembly includes a backrest member 21 having depending side support arms 22. At their lower ends the depending side support arms 22 are pivotally supported on shoulder studs 23 journaled in the lower ends of the brackets 19. The backrest 21 thus is mounted for swinging movement about a pivot axis defined by the shoulder studs 23 from its normal upstanding position indicated in FIG. 1 to a forwardly inclined position.

Interposed between one of brackets 19, preferably an outboard bracket, and the contiguous depending side support arm 22 is a latch mechanism, generally designated 24. The latch mechanism 24 has a dual function. First, it controls the backrest 21 angle lock, i.e., it holds the backrest in its upstanding position against swinging movement forwardly over the seat cushion 13. Such an angle lock or latching function is required so that the backrest cannot be thrown in a forward direction every time the vehicle is rapidly decelerated by the sudden or hard application of its brakes or if the misfortune of an impact stop should occur.

The latch mechanism 24 has a second function of controlling backrest angle adjustment. By this is meant the position of the backrest relative to the front edge of the seat cushion. Adjustment of this position permits the seat occupant to adjust the depth of the seat so that proper underknee support can be obtained. A person having a short knee to hip dimension would want the backrest positioned closer to the front edge of the seat than would a taller person having a longer knee to hip dimension.

The first or backrest angle lock function of the latch mechanism 24 is achieved through a first detent means comprising an abutment 25 carried on a control plate 26 and a coacting abutment 27 formed on a control lever 28.

Figure 2:
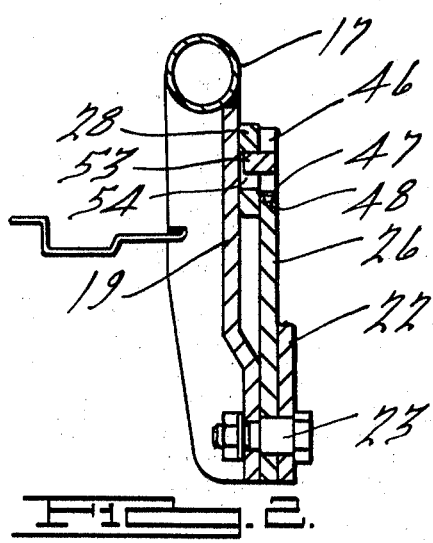
FIGS. 2 and 3 are section views on the lines 2-2 and 3-3 of FIG. 1, respectively.
Figure 3:
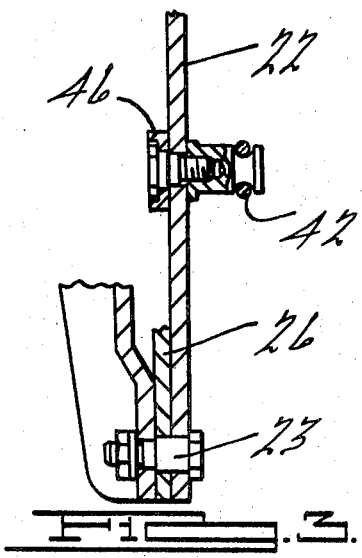
Figure 4:
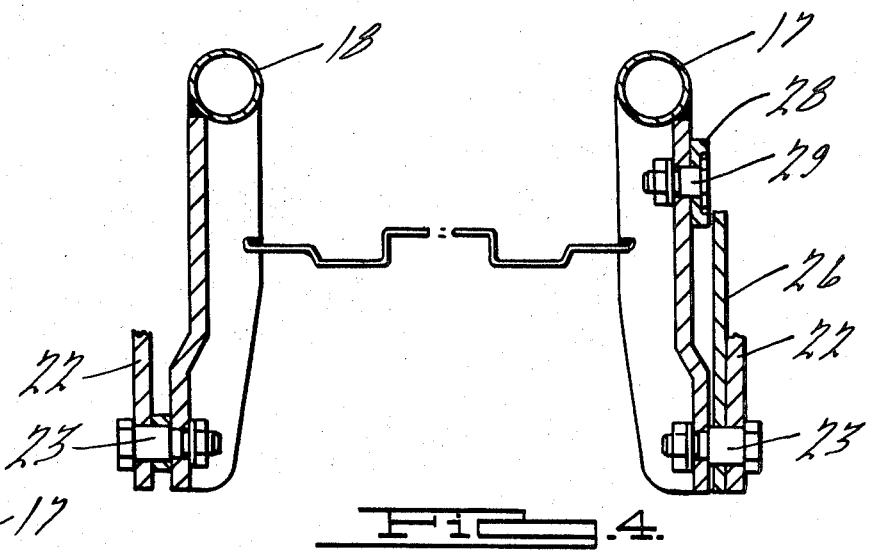
FIG. 4 is a section view on the line 4-4 of FIG. 1 illustrating symmetrical components at the sides of the seat assembly.
Figure 6:
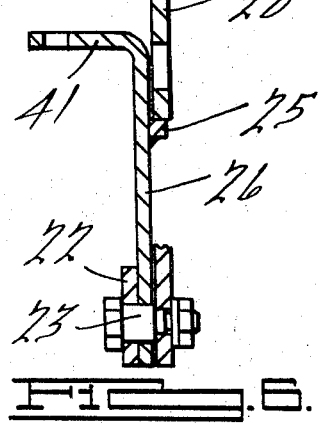

The control plate 26 is a substantially triangular member pivotally supported at its apex, its lower end, on the shoulder stud 23 between the depending side arm 22 and the bracket 19, see FIGS. 2, 4 or 6. The abutment 25 projects out of the plane of the plate 26 on the bracket 19 side.

Figure 7:
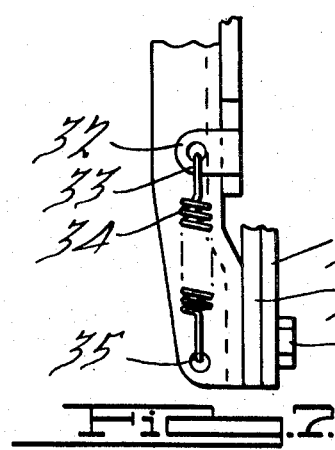

The control lever 28 is an elongated curved member that is pivotally mounted on the upper rear corner of the bracket 19 on a pivot stud 29. The forward or left end 31, as viewed in FIG. 1, of the lever 28 has an inwardly projecting tab 32, see FIG. 7. The tab is apertured to receive one end 33 of a tension spring 34 hooked at its other end 35 in an aperture in the bracket 19. Tension spring 34 maintains the lower edge 36 of lever 28 in engagement with the abutment 25.

The control lever 28 is swingable about the pivot stud 29 against the resistance of spring 34 by manipulation of a handle 37, as will be more fully explained.

A control plate 26 is coupled to the depending side arm 22 of the bracket 21 by a stiff tension spring 38. The forward or left end 39 of the spring 38, as viewed in FIG. 1, engages an apertured tab 41 projecting outwardly from the plane of the control plate 26 (see FIG. 6). The rear or right end 42 of the spring 38 is hooked over a stud 43 anchored in the depending backrest side arm 22.

Because of the weight of the backrest 21 and its offcenter relationship to the pivot axis defined by the pivot studs 23, the spring 38 biases the control plate 26 in a clockwise direction, as viewed in FIG. 1. A stop or abutment 44 welded on the bracket 19 at its rear edge is engaged by the edge 45 of the control plate 26 to limit such clockwise biasing action.

It is necessary, however, that the control plate 26 and the depending side arm 22 be movable relative to one another to achieve the secondary function of the latch mechanism 24, i.e., the backrest angle adjustment function in which the seat back 21 may be positioned selectively relative to the front edge of the cushion 13. As best seen in FIG. 1, a pawl 46 is pivotally mounted on the pivot stud 43 secured to the depending side arm 22. The pawl 46 has a series of teeth 47 meshing with a series of teeth 48 radially carried on the upper end of the control plate 26.

The pawl 46 is urged in counterclockwise direction, as viewed in FIG. 1, about pivot stud 43 by a spring 49 which is tensioned between an end 51 of pawl 46 and a tank 52 projecting from the support arm 22. At its forward end, the pawl 46 has a tab 53 which extends from the plane of the pawl 46 and projects through an arcuate slot 54 in the control lever 28.

OPERATION

Referring to FIG. 1, the backrest 21 is shown positioned in its rearmost position relative to the front edge of the seat cushion 13. It is held by the latching mechanism 24 against forward tilting movement over the cushion 13.

If it is desired to tilt the backrest 21 forwardly to permit ingress to or egress from the vehicle passenger compartment seating area rearwardly of the seat 13, this can be done by releasing the first stage of the latch mechanism 24. This first stage release is obtained by lifting the handle 37 of the control lever 28 a sufficient distance so that its abutment 27 will be out of the path of the abutment 25 of the control plate 26. There is then nothing blocking forward swinging movement of the backrest 21 support arms 22 about the pivot axis defined by the pivot studs 23.

Upon return of the backrest 21 to its normal upstanding position, the control lever 28 under influence of the spring 34 again will drop into the FIG. 1 position in which the abutments 27 and 25 are in abutting relationship. The backrest again will be latched against forward tilting movement.

Should it be desired to adjust the backrest 21 angle so that the backrest in effect is moved closer to the front edge of the cushion 13 to accommodate a person having a shorter knee to hip dimension, the two-stage release operation of the latch mechanism must be brought into play.

The two-stage operation is accomplished by raising the handle 37 through and beyond the first stage position or the position in which the abutments 27 and 25 are immediately out of alignment. Movement of the handle 37 beyond this first stage position results in the control lever 28 being swung to a position in which the lower edge 55 of the slot 54 abuts the tab 53 on the end of the pawl 46. Further upward movement of the control lever 28 beyond this point results in the teeth 47 on the pawl 46 being lifted from the teeth 48 on the control plate 26.

The force exerted on the control plate 26 by the spring 38 holds control plate against the abutment 44 on the bracket 19. If forward pressure is applied to the backrest, the disengaged pawl 46 will be movable relative to the control plate within a range extending between the position shown in FIG. 1 to a position in which the tab 53 abuts the edge 56 of the extension carrying the tab 41 on the control plate. Release of the handle 37 at any position within the range of movement of the pawl relative to the control plate results in reengagement of the teeth 47 on the pawl 46 with the teeth 48 on the control plate 26.

As will be readily apparent, the position of engagement of the pawl 46 with the control plate 26 determines the at rest position of the backrest relative to the seat cushion since the at rest position of the control plate 26 relative to the seat cushion is always determined by the relationship of its edge 45 relative to the stop or abutment 44.

As soon as the pawl 46 is locked to the control plate 26, spring 34 which is relatively much weaker than the spring 38 is able to function to return the control lever 28 to the position in which the abutments 27 and 25 are again in alignment thus latching the backrest against forward tilting movement relative to the seat cushion 13 until such time as the handle 37 is lifted sufficiently to move the abutments 27 and 25 out of alignment with each other.

It will be understood that the invention is not to be limited to the exact construction shown and described but that various changes and modifications may be made without departing from the spirit and scope of the invention.

We claim:

1. A vehicle seat assembly comprising:

a seat cushion supported on a frame structure, a backrest having depending support arms at each side thereof, pivot means pivotally supporting the support arms in juxtaposition to the seat cushion for forwardly swingable movement of the backrest between an upstanding position and a forwardly inclined position, and a two-stage latch mechanism interposed between the frame structure and one of the support arms controlling backrest angle lock and backrest angle adjustment, the latch mechanism having a control lever pivotally supported on the seat cushion frame structure and operable to release the first stage of the latch mechanism to permit angular adjustment of the backrest over the seat cushion through a limited range of movement, a control plate interposed between the frame structure and the one support arm for pivotal movement about the pivot means supporting the latter, the first stage of the latch mechanism comprising a detent means engaged with a first part of the control plate and the second stage a pawl means engaged with a second part of the control plate, the detent means being integral with the control lever so that movement of the latter to a predetermined position results in disengagement of the detent means from the first part of the control plate whereby the backrest is unlocked for full forward tilting movement, the pawl means being independently pivotally supported on the support arm and engageable by the control lever upon movement of the latter beyond the detent means disengagement position, the pawl means upon engagement by the control lever being disengaged from the second part of the control plate whereby the backrest support arm and thereby the backrest can be moved relative to the control plate to change the backrest adjustment angle.

2. A vehicle seat assembly comprising:

a seat cushion, a frame structure for the seat cushion having depending brackets at the sides thereof, a backrest having depending support arms at each side thereof, pivot means pivotally coupling the support arms to the brackets, the backrest being swingable about the pivot axis of the pivot means from an at rest upstanding position to a forwardly inclined position over the seat cushion, a latch mechanism interposed between one of said brackets and an adjacent one of the support arms, the latch mechanism having a detent means controlling backrest angle lock and a pawl means controlling backrest angle adjustment, the latch mechanism having a single control lever pivotally supported on the one bracket for swinging movement and a control plate interposed between the one bracket and the one support arm, the control plate being pivotal about the pivot means coupling the one support arm to the one bracket, detent means for controlling the backrest angle lock comprises coacting abutments on control plate and control lever which when in abutting relation to each other restrain forward swinging movement of the backrest about its pivot axis, the control lever being operable to release the detent means to unlock the backrest for forward tilting movement or to release the pawl means sequentially of the release of the detent means to permit backrest angle adjustment, and stop means restricting movement of said backrest rearwardly over said seat cushion.

3. A vehicle seat assembly according to claim 2, in which:

the pawl means for controlling the backrest angle adjustment comprises a pawl pivotally mounted on the one support arm coacting with a circular segment of the control plate, the pawl and the control plate circular segment having interlocking abutment portions which when interlocked prevent relative movement of the support arm and control plate thereby maintaining the backrest at a selected angle of adjustment.

4. A vehicle seat assembly according to claim 3, in which:

the stop means comprises an abutment carried on the one bracket coacting with the control plate, and the control plate when held between the control lever abutment and the bracket abutment preventing movement of the backrest forwardly over the seat cushion or rearwardly beyond a predetermined upright position.

5. A vehicle seat assembly according to claim 2, in which:

the pawl means for controlling the backrest angle adjustment comprises a pawl pivotally mounted on the one support arm coacting with a circular segment of the control plate, the pawl and circular segment having engageable teeth which when engaged prevent relative movement of the support arm and control plate thereby maintaining the backrest at a preselected angle of adjustment when in an upstanding position, the control lever upon being swung to a first position to release the first detent means causing disengagement of the coacting abutment on the control plate and control lever whereby the backrest is swingable about the support arm pivot means to a forwardly tilted position over the seat cushion, the control lever upon being swung beyond the first position to a second position further causing disengagement of the pawl from the circular segment teeth whereby the pawl, and therefor the support arm carrying the latter, are shiftable for backrest angle adjustment.

6. A vehicle seat assembly according to claim 5, in which:

the stop means comprises an abutment carried on the one bracket coacting with the control plate, the control plate is held between the control lever abutment and the bracket abutment to prevent movement of said backrest forwardly over said seat cushion or rearwardly beyond a predetermined upright position.

7. A vehicle seat assembly according to claim 6 in which a tension spring extends between the control plate and the support arm to maintain the control plate, the pawl and the bracket abutment in biased relationship to one another.

8. A vehicle seat assembly according to claim 7, in which a tension spring extends between the one support arm and a part of the pawl to urge the latter in circular segment engagement direction.

9. A vehicle seat assembly according to claim 8, in which a tension spring extends between the one b4acket and the control lever to urge the latter in bracket abutment engaging direction.